United States Patent
Koch et al.

(10) Patent No.: US 8,227,746 B2
(45) Date of Patent: Jul. 24, 2012

(54) METHOD AND SYSTEM TO MEASURE NOISE INSERTED MM-WAVES

(75) Inventors: Stefan Koch, Oppenweiler (DE); Marc Guthoerl, Delmenhorst (DE)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 12/631,090

(22) Filed: Dec. 4, 2009

(65) Prior Publication Data
US 2010/0194625 A1    Aug. 5, 2010

(30) Foreign Application Priority Data

Jan. 21, 2009  (EP) .................................... 09150983

(51) Int. Cl.
  *G12B 13/00*  (2006.01)
(52) U.S. Cl. .................................................. 250/252.1
(58) Field of Classification Search ............... 250/252.1, 250/340, 341.1, 370.08; 342/174
  See application file for complete search history.

(56) References Cited

U.S. PATENT DOCUMENTS

| | | | | |
|---|---|---|---|---|
| 3,599,207 A | * | 8/1971 | Foiani et al. ..................... 342/52 |
| 3,653,045 A | * | 3/1972 | Roeder ........................... 342/351 |
| 3,777,270 A | * | 12/1973 | Hardy et al. ................... 342/351 |
| 4,235,107 A | * | 11/1980 | Ludeke et al. ................. 374/122 |
| 4,292,638 A | * | 9/1981 | Lazarchik et al. .............. 342/88 |
| 4,488,559 A | * | 12/1984 | Iskander ....................... 600/430 |
| 5,438,336 A | | 8/1995 | Lee et al. |
| 5,688,050 A | | 11/1997 | Sterzer et al. |
| 5,949,845 A | | 9/1999 | Sterzer |
| 6,052,024 A | * | 4/2000 | Lo et al. ......................... 330/53 |
| 2005/0053118 A1 | | 3/2005 | Stephan et al. |
| 2005/0122254 A1 | * | 6/2005 | Ammar ......................... 342/174 |
| 2006/0022662 A1 | * | 2/2006 | Bills ........................... 324/76.14 |

OTHER PUBLICATIONS

Alan B. Tanner, "Development of a High Stability Water Vapor Radiometer," Mar. 1997, 17 pp, (available at http://trs-new.jpl.nasa.gov/dspace/handle/2014/21855, last accessed Feb. 10, 2011).

* cited by examiner

*Primary Examiner* — David Porta
*Assistant Examiner* — Marcus Taningco
(74) *Attorney, Agent, or Firm* — Oblon, Spivak, McClelland, Maier & Neustadt, L.L.P.

(57) ABSTRACT

The present invention relates to a radiometer for detecting electromagnetic signals in the microwave and millimeter wave range. The radiometer comprises an antenna operable to receive the electromagnetic signals, an internal noise signal generator operable to receive a control signal and to generate and output a calibration noise signal depending on the control signal, and a coupler operable to couple the received electromagnetic signal with the calibration noise signal and to output a coupled electromagnetic signal. Furthermore, the internal noise signal generator is activated based on the control signal.

15 Claims, 3 Drawing Sheets

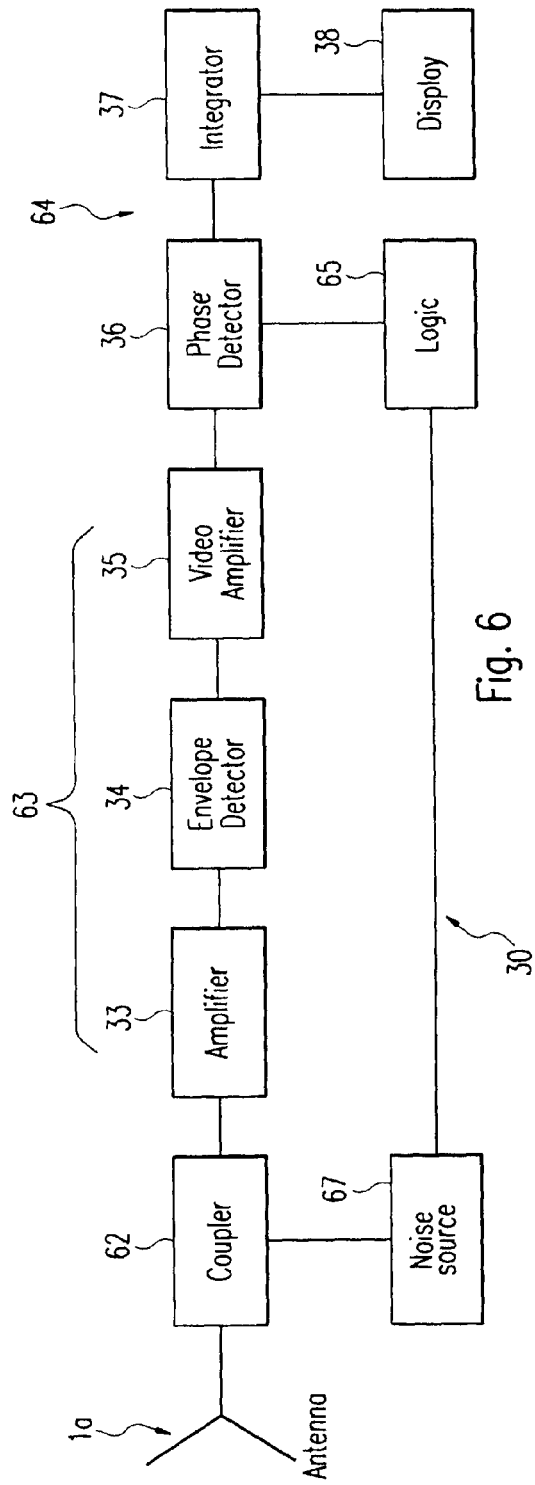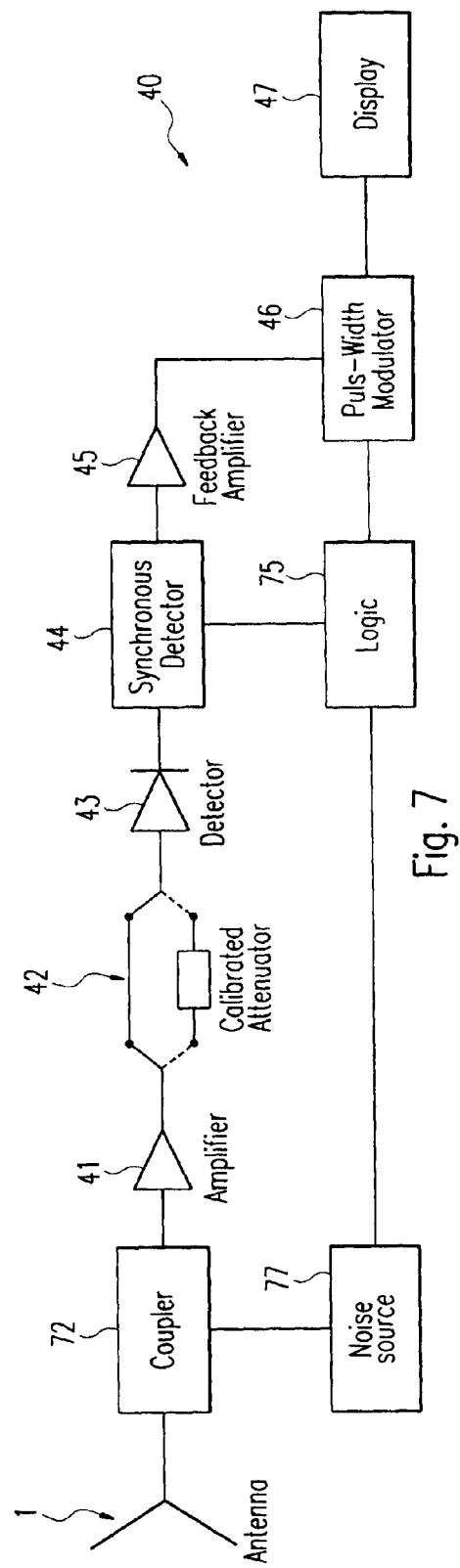

METHOD AND SYSTEM TO MEASURE NOISE INSERTED MM-WAVES

FIELD OF THE INVENTION

The stabilisation of mm-wave passive imaging systems, also called radiometer, is the focus of this paper and helps to optimize the detection of hidden obstacles under clothes or in a way that they cannot be seen by the eye. Therefore the system is preferably part of security measurements at e.g. airports, bus stations or public buildings.

The system can also be used for spectroscopic analysis of a substance or for probing in medicine or biology to differ for example between tumours and healthy tissue. Astronomy can be considered as another field of the invention, whereby the surface radiation of the earth, the radiation of space objects like for example stars or meteorites or the cosmic background radiation can be measured.

BACKGROUND OF THE INVENTION

The Crookes radiometer is an early-model infrared-radiation and light-detector. A variant type of this is the Nichols radiometer that operates on a different principle, and is more sensitive than the Crookes type. These two models are very early versions of mm-wave radiometers.

To obtain a high quality mm-wave radiometric picture, a very stable mm-wave imaging system is needed. There are some well known stabilisation methods, developed in 1960's for radio astronomy. One solution is to stabilize the mm-wave imaging system by adding a well known noise-signal, like e.g. a noise insertion radiometer.

A noise insertion radiometer consists of a Dicke-radiometer wherein a switch switches between a mm-wave antenna signal and an internal noise signal.

SUMMARY OF THE INVENTION

The present invention describes a radiometer for detecting electromagnetic signals in the microwave and millimetre wave range, which comprises an antenna operable to receive the electromagnetic signals, an internal noise signal generator operable to receive a control signal and to generate and output a calibration noise signal depending on the control signal, and a coupler operable to couple the received electromagnetic signal with the calibration noise signal and to output a coupled electromagnetic signal. Thereby the internal noise signal generator is activated based on the control signal.

Favourably, the radiometer comprises a detector operable to receive and process the coupled electromagnetic signal and to output a temperature value based on the coupled electromagnetic signal.

Favourably, the radiometer comprises a logic circuit operable to receive, process and send data from and to the detector and to send the control signal to the internal noise signal generator.

Favourably, the control signal is a square wave signal.

Favourably, the control signal is a pulse-width modulated signal.

Favourably, the radiometer comprises an antenna noise signal generator operable to generate and output an antenna noise signal which is coupled to the received electromagnetic signal before the calibration noise signal is coupled to the received electromagnetic signal.

Favourably, the control signal comprises a signal level for calibrating the radiometer and a signal level for measuring the received electromagnetic signals, wherein the time length of the signal level for measuring the received electromagnetic signals is longer than the time length of the signal level for calibrating the radiometer.

The present invention also relates to a method for detecting electromagnetic signals in the microwave and millimetre wave range, which comprises the steps of receiving the electromagnetic signals via an antenna, generating a calibration noise signal depending on a control signal, and coupling the electromagnetic signal with the calibration noise signal. Thereby the generation of the calibration noise signal is activated based on the control signal.

Favourably, the method comprises the step of outputting a coupled electromagnetic signal, after coupling the electromagnetic signal with the calibration noise signal. Favourably, the method comprises the step of receiving and processing the coupled electromagnetic signal by a detector and outputting a temperature value based on the coupled electromagnetic signal.

Favourably, the method comprises the step of receiving, processing and sending data from and to the detector and sending the control signal to a noise signal generator to control the generation of the calibration noise signal.

Favourably, the control signal is a square wave signal.

Favourably, the control signal is a pulse-width modulated signal.

Favourably, the method comprises the step of generating and outputting an antenna noise signal by an antenna noise signal generator, whereby said antenna noise signal is coupled to the received electromagnetic signal before the calibration noise signal is coupled to the received electromagnetic signal.

Favourably, the control signal comprises a signal level for calibrating the radiometer and a signal level for measuring the received electromagnetic signals, wherein the time length of the signal level for measuring the received electromagnetic signals is longer than the time length of the signal level for calibrating the radiometer.

The object of the present invention is to reduce the costs of a mm-wave imaging system, which is achieved by a reduction of components that cause a reduction of MMIC chip size or a reduction of external waveguide components.

With the invention, a RF switch for very high frequencies is no longer needed. This reduces the cost of MMIC's by reducing the chip size or by reducing external wave guide components.

The main advantages of the present invention are that the system costs less due to the reduced components (reduction of chip size or of external components) and that no impedance mismatch occurs due to the removed RF switch.

DESCRIPTION OF THE FIGURES

The embodiments of the present invention described by the present invention will become clearer in view of the following figures, wherein FIG. 6 shows a block diagram of another radiometer being a first alternative embodiment of the present invention, and FIG. 7 shows a block diagram of another radiometer being a second alternative embodiment of the present invention.

DETAILED DESCRIPTION OF THE INVENTION

The present invention relates to a novel design in wavelength imaging systems and is working in the range between infrared and microwave radiation; preferably in the Terahertz radiation range of about 3 THz to 300 GHz, thus within a wavelength range of about 100 µm to 1000 µm. In the following, the system can refer to a microwave or millimeter wave radiometer or a radiometric sensor or just "radiometer".

A radiometric sensor is a device for the detection and measurement of electromagnetic energy which is noise-like in character, said device preferably comprises an antenna, a receiver and an output indicator. The electromagnetic energy can originate from a natural or an artificial source, which can be either broadband or of the resonant line type in the frequency domain.

A radiometric sensor is frequently referred to as a temperature measuring device, since the output indicator is calibrated in degrees Kelvin. Higher temperatures might be related to more incident radiation power. Generally, the term "radiometer" denotes an infrared radiation detector, yet it also comprises detectors operating on any electromagnetic wavelength, e.g. spectroradiometer.

Figure 1:
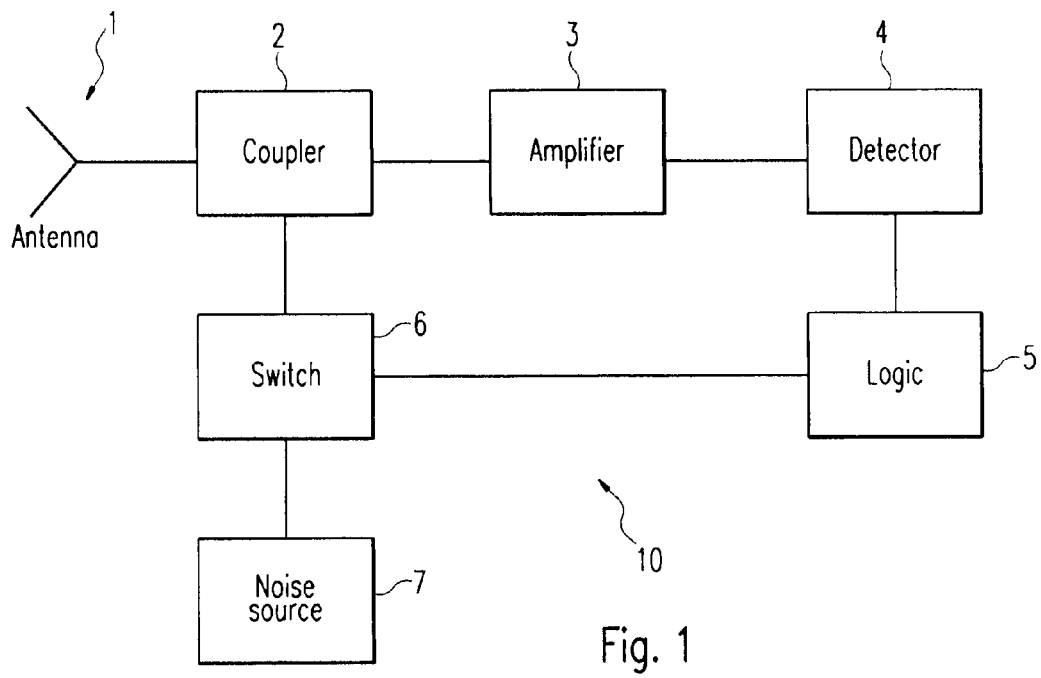
FIG. 1 shows a block diagram of a radiometer as an example of the present invention.

FIG. 1 shows a block diagram of a radiometer 10 which comprises an antenna 1, a coupler 2, an amplifier 3, a detector 4, a logic circuit 5, a switch 6 and a noise source 7.

The antenna 1 is operable to receive electromagnetic signals according to the above-mentioned range and sends these signals to the coupler 2. The antenna 1 can be a horn antenna.

The coupler 2 is operable to receive the signal from the antenna 1 and via the switch 6 the noise signal from the noise source 7 and output a combined signal thereof. The coupler 2 can be a directional coupler. The combination of the signals is performed by for example adding the amplitudes of the two signals. The combined signal can either consist of the antenna signal or of both the antenna signal and the noise signal.

The amplifier 3 is operable to receive and amplify the combined signal from the coupler 2 and output an amplified signal thereof. The amplification can be manually instructed, predetermined or automatically set based on the received combined signal.

The detector 4 is operable to receive and process the amplified signal from the amplifier 3, detect the received electromagnetic waves based on the amplified signal and output and display corresponding results and data on a monitor. The detector 4 can be a detector diode presenting a specific value which reflects the received intensity of a specific wavelength.

The logic circuit 5 is operable to receive the amplified signal, the data and/or the value from the detector 4 and adjust and output a control signal to the switch 6 depending on the amplified signal, the data and/or the value of the detector 4. The logic circuit 5 also ensures that the detector and the switch are synchronized, so that the detector actually measures only a specific signal; either the antenna signal or the combined signal of the antenna signal and the noise signal. In another example, the logic circuit 5 merely indicates to the detector 4 which signal is currently measured.

The switch 6 is operable to receive the control signal and based on the control signal block or let the noise signal from the noise source 7 pass through to the coupler 2. Thus, in the "on"-state the switch 6 connects the noise source 7 with the coupler 2 and in the "off"-state the switch 6 preferably disconnects the noise source 7 or connects the coupler 2 with the ground. The switch is preferably a RF switch like a PIN diode.

The noise source 7 is operable to generate a noise signal and output the noise signal to the switch. Thereby the noise source 7 continuously generates the noise signal without being switched off during the reception, the processing and/or the measurement of the received electromagnetic signal.

All devices within the radiometer 10 which are connected to each other as mentioned above are preferably impedance matched, so that no attenuation of the signals due to the reflection occurs. In case attenuation is wanted for example when a signal is too strong, the impedance can be adjusted accordingly. This fact applies to all devices described in the respective figures of the present invention.

Figure 2:
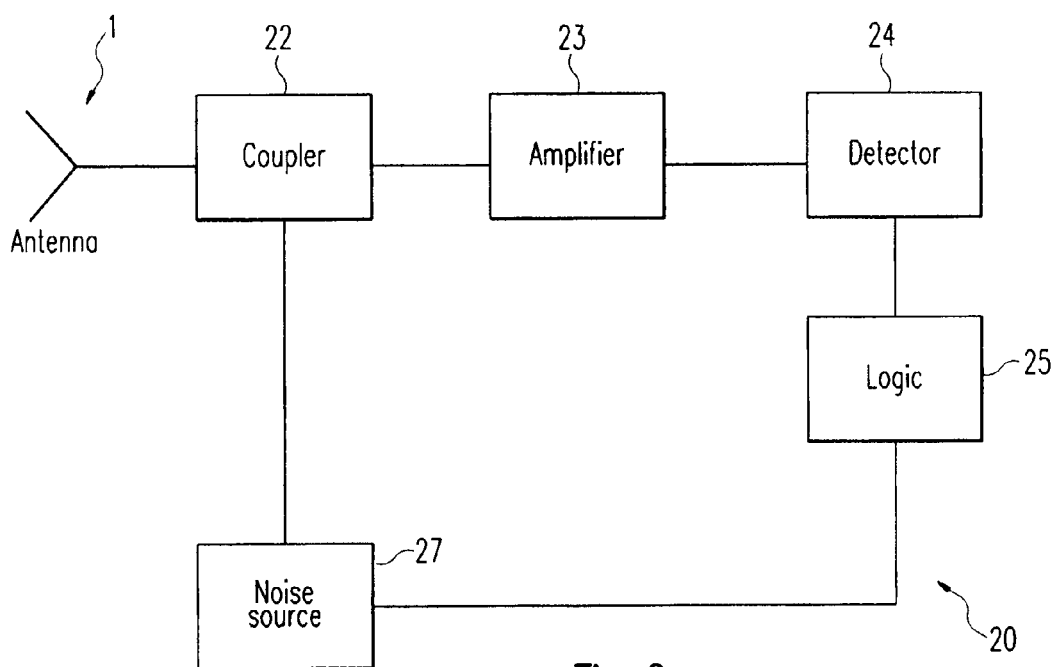
FIG. 2 shows a block diagram of another radiometer being an embodiment of the present invention.

FIG. 2 shows a block diagram of another radiometer 20 which comprises an antenna 1, a coupler 22, an amplifier 23, a detector 24, a logic circuit 25 and a noise source 27.

The antenna 1 is operable to receive electromagnetic signals according to the above-mentioned range and sends these signals to the coupler 22. The antenna 1 can be a horn antenna.

The coupler 22 is operable to receive the signal from the antenna 1 and the noise signal from the noise source 27 simultaneously and output a combined signal thereof. The coupler 22 can be a directional coupler or a mixer or any other kind of processing device capable to combine the two signals in a specific way. The combination of the signals is performed by for example adding the amplitudes of the two signals.

The amplifier 23 is operable to receive and amplify the combined signal from the coupler 22 and output an amplified signal thereof. The amplification can be manually instructed, predetermined or automatically set based on the received combined signal.

The detector 24 is operable to receive and process the amplified signal from the amplifier 23, detect the received electromagnetic waves based on the amplified signal and output and display corresponding results and data on a monitor. The detector 24 can be a detector diode presenting a specific value which reflects the received intensity of a specific wavelength. The detector is preferably a temperature meter which responses to the difference between the first and second level of the received amplified signal. The first level is based on the measure antenna signal and the second level is based on the combination of the antenna signal and the noise signal. According to FIG. 5, the first level could base on the combination of antenna signal and antenna noise signal.

The logic circuit 25 is operable to receive the amplified signal, the data and/or the value from the detector 24 and adjust and output a control signal to the noise source 27 depending on the amplified signal, the data and/or the value of the detector 24. The logic circuit 25 is preferably a control circuit which overviews, processes and interacts with all devices of the radiometer. The logic circuit 5 preferably ensures that the detector and the switch are synchronized, so that the detector actually measures only a specific signal; either the antenna signal or the combined signal of the antenna signal and the noise signal. In another example, the logic circuit 5 merely indicates to the detector 4 which signal is currently measured.

The noise source 27 is operable to receive the control signal from the logic circuit 25, generate a noise signal based on the control signal and output the noise signal. The control signal can turn the generation of the noise signal of the noise source 27 on and off. The noise source 27 can be a noise diode, which is preferably integrated in the coupler 22, whereby the power of the noise diode is controlled by the control signal. Preferably, the noise source 27 can switch between cold and warm noise sources and thus provide a noise source range which corresponds to a temperature range of about 40 to 300K. The temperature of the noise source 27 is controlled by the control signal and depends on the temperature measured or to be measured by the antenna 1.

Eventually, all devices in FIG. 2 are similar to the devices in FIG. 1, except that the noise diode is directly connected into the signal path of the directional coupler instead of interconnecting an RF switch. The regulation of the inserted noise power by the noise diode is no longer controlled by switching the RF switch on and off. This regulation is done by supplying the noise diode by a square wave signal or a pulse-width modulated signal, supplied by the control logic of the radiometer.

It is emphasized that instead of an amplifier 23 and a detector 24, any other kind of radio receiver like a tuned radio frequency receiver as shown in FIG. 6, a super heterodyne receiver with and without input signal amplifier can be used. Furthermore, any Dicke-radiometer can be equipped with said noise source 27 to replace the switch commonly known as Dicke-switch.

Using this design, cost reduction can be achieved by reducing the number of components used, resulting in reduction of chip size or reduction of external waveguide components.

One of the key features of the invention is thus to control the strength of the inserted noise signal in an mm wave imaging system using the noise diode.

Figure 3:
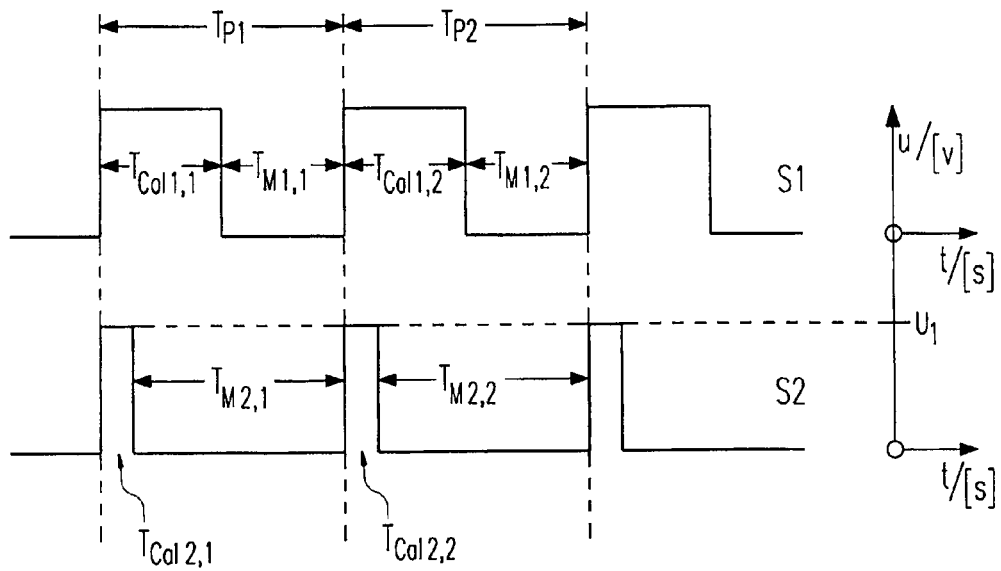
FIG. 3 shows a signal diagram describing the control signal for the internal noise signal generator.

FIG. 3 shows a signal diagram describing the two different control signals S1 and S2 generated by the logic circuit 5 or 25 for the switch 6 or for the internal noise signal generator 27.

Both control signals S1 and S2 are periodic square wave signals comprising the period time lengths $T_{P1}$ and $T_{P2}$, whereby the two periods $T_{P1}$ and $T_{P2}$ are favourably equal in length. The signals S1 and S2 respectively comprise the upper limit with U1 volts and the lower limit with zero volts, whereby U1 is bigger than zero volts. Of course, S1 and S2 comprise a plurality of periods like $T_{P1}$, respectively.

The signal S1 comprises within its periods $T_{P1}$ and $T_{P2}$ the calibration time $T_{Cal\,1,1}$ and the measurement time $T_{M\,1,1}$ and the calibration time $T_{Cal\,1,2}$ and the measurement time $T_{M\,1,2}$ respectively. In FIG. 3, the calibration time $T_{Cal\,1,1}$ is equal to the measurement time $T_{M\,1,1}$ and the calibration time $T_{Cal\,1,2}$ is equal to the measurement time $T_{M\,1,2}$.

The signal S2 comprises within its periods $T_{P1}$ and $T_{P2}$ the calibration time $T_{Cal\,2,1}$ and the measurement time $T_{M\,2,1}$ and the calibration time $T_{Cal\,2,2}$ and the measurement time $T_{M\,2,2}$ respectively. In FIG. 3, the calibration time $T_{Cal\,2,1}$ is shorter than the measurement time $T_{M\,2,1}$ and the calibration time $T_{Cal\,2,2}$ is shorter than the measurement time $T_{M\,2,2}$.

During the calibration time, the noise signal is combined with the antenna signal as described in FIG. 1 or 2, while during the measurement time, the noise signal is not combined with antenna signal and only the antenna signal is received and processed in the radiometer. The switching is preferably not constant, meaning that the length of the measurement time should be longer than the length of the calibration time. In this way the results are better and more stable and reliable and less time is used for calibration. Thus, preferably signal S2 is used as control signal than signal S1.

As soon as the gradient of the drift curve is high, more calibration time is required; in case the gradient of the drift curve is low, less calibration time is required. This description is clearer in view of the gain vs. time diagram in FIG. 4, wherein the first derivative $g(t_1)$ at the time $t_1$ of the drift curve function is steeper than the first derivative $g(t_2)$ at the time $t_2$. The steeper the first derivative of the function, the larger the drift and the more calibration time is required.

In case $T_{P1}$ and $T_{P2}$ are not equal, either the calibration time $T_{Cal\,1,1}$ and the calibration time $T_{Cal\,1,2}$ are equally long or the measurement time $T_{M\,1,1}$ and the measurement time $T_{M\,1,2}$ are equally long or none of them is equal to each other. In case $T_{P1}$ and $T_{P2}$ are equal in length, the calibration time $T_{Cal\,1,1}$ and the calibration time $T_{Cal\,1,2}$ are equally long and at the same time the measurement time $T_{M\,1,1}$ and the measurement time $T_{M\,1,2}$ are equally long.

In another example, also the upper limit U1 and/or the lower limit of one period might be different to the upper limit U1 and/or the lower limit of another period. The lower limit is also not restricted to zero volts.

In other examples, the signals S1 and S2 can be delta signals or signals with different or equal steep slopes of a saw tooth generator or pulse-width modulated signals.

Figure 4:
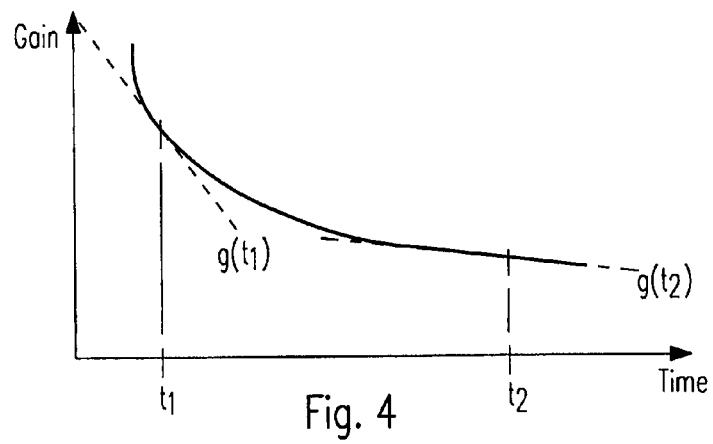
FIG. 4 shows a gain vs. time diagram describing the drift curve of a radiometer.

FIG. 4 shows a gain vs. time diagram describing the drift function of a radiometer. The x-axis is the time axis and the y-axis is the gain axis. The graph of the drift function is a hyperbole, wherein the left-handed limes goes to positive infinity in the y-direction approaching a line parallel to the y-axis. The right-handed limes goes to positive infinity in the x-direction approaching a line parallel to the x-axis.

The sensitivity of a radiometer like regarding the minimum detectable signal is determined by the amplitude of the fluctuations present at the output indicator in the absence of a signal.

One source for fluctuations lies within the noise waveform. This fluctuation can be reduced by reducing the post-detection bandwidth or by longer integrating the observed antenna signal.

Another source of fluctuations which occur at the receiver output is attributable to receiver gain instabilities. This fluctuation can be reduced by reducing the RF input temperature unbalance which is achievable by addition of noise to the signal port of the radiometer as shown in FIG. 5, use of a low temperature comparison source, introduction of gain modulation and furthermore.

According to the graph, the longer the radiometer measures the antenna signal, the less steep the slope of the first derivate will be and the less drift will occur in the radiometer; thus less calibration will be required to reset the radiometer.

Figure 5:
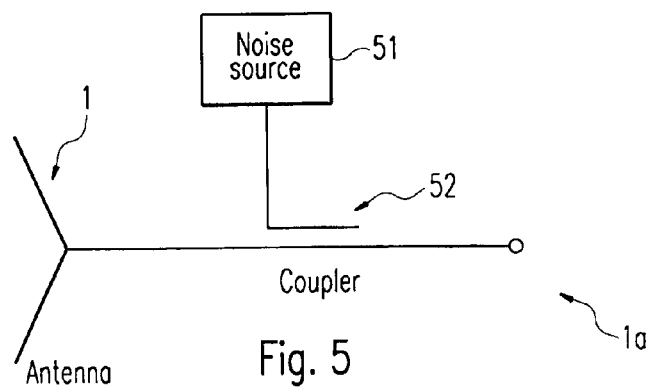
FIG. 5 shows a block diagram of an antenna coupled to an internal noise source.

FIG. 5 shows a block diagram of an antenna 1a which comprises an antenna 1 coupled to an internal noise source 51 via a coupler 52.

In the shown example, the noise signal of the internal noise source 51 is never turned off by a switch or a control signal and is thus continuously combined with the signal of the antenna 1 by the coupler 52. The antenna 1 corresponds to the antenna 1 described in FIG. 1 and the coupler 52 can correspond to the coupler 2 of FIG. 1 or the coupler 22 of FIG. 2. The noise source 51 corresponds to the noise source 7 of FIG. 1, whereby the noise signal can be a predetermined signal which is periodically or continuously generated.

For specific purposes, the antenna 1 in the FIGS. 1 and 2 can be replaced by the antenna 1a. Especially, in case the temperature based on the received antenna signal is calculated in a different way.

FIG. 6 shows a block diagram of another radiometer 30, wherein the radiometer 30 comprises an antenna 1a, a coupler 62, an amplifier 33, an envelope detector 34, a video amplifier 35, a phase detector 36, an integrator 37, a display 38, a logic circuit 65 and a noise source 67.

The amplifier 33, the envelope detector 34 and the video amplifier are part of an amplifier apparatus 63 which is similar to the amplifier 3 or 23 shown in FIGS. 1 and 2, respectively.

The phase detector 36, the integrator 37 and the display 38 are part of a detector apparatus 64 which is similar to the detector 4 or 24 shown in FIGS. 1 and 2, respectively.

As mentioned above, there are different kind of radio receivers which can be used instead of the amplifier apparatus 63 and the detector apparatus 64.

The antenna 1a corresponds to the antenna 1a of FIG. 5, the coupler 62 corresponds to the coupler 22 of FIG. 2, the logic circuit 65 corresponds to the logic circuit 25 of FIG. 2 and the noise source 67 corresponds to the noise source 27 of FIG. 2.

The amplifier 33 is similar to the amplifier 3 or 23 of FIGS. 1 and 2, respectively.

The envelope detector 34 is an electronic circuit that takes a high-frequency signal as input like the amplified signal, and provides an output which is the outline or "envelope" of the original signal. The envelope detector 34 in a simple setup preferably comprises a diode, a capacitor and a resistor. The capacitor in the circuit stores up charge on the rising edge, and releases it slowly through the resistor when the signal falls. The diode in series ensures current does not flow backward to the input to the circuit.

The video amplifier 35 deals with video signals, has varying bandwidths depending on the received video signal and eventually amplifies the signal of the envelope detector 34.

The phase detector 36 is a frequency mixer or analog multiplier circuit that generates a voltage signal which represents the difference in phase between two signal inputs received from the video amplifier 35 and from the logic device 65.

The integrator 37 integrates the input signals received from the phase detector 36 and outputs the signals to the display 38.

The display 38 shows the results of the integrator 37, the phase detector 36, the envelope detector 34 and/or just the received electromagnetic signal from the antenna 1a within a diagram. Or the temperature value of the received electromagnetic signal can be shown.

FIG. 7 shows a block diagram of another radiometer 40, wherein the radiometer 40 comprises an antenna 1, a coupler 72, an amplifier 41, a separately connectable calibrated attenuator 42, a detector 43, a synchronous detector 44, a feedback amplifier 45, a pulse-width modulator 46, a display 47, a logic circuit 75 and a noise source 77.

The antenna 1 and the coupler 72 correspond to the antenna 1 and to the coupler 22 of the above mentioned figures, respectively.

The logic circuit 75, the noise source 77 and the display 47 are similar to the logic circuit 25, the noise source 27 and the display 38 of the above mentioned figures, respectively.

The amplifier 41 is operable to amplify the combined signal of the coupler 72 and output the signal to an adjustment device.

The calibrated attenuator 42 is part of the adjustment device comprising said calibrated attenuator, a wire without resistor parallel to the attenuator 42 and two switches as respective input and output of the adjustment device. The two switches either connect simultaneously to the calibrated attenuator 42 or alternatively to the wire; thus a signal either passes through the wire or through the attenuator. When the attenuator is switched in, the amount of calibrated noise signal is automatically adjusted for a zero detector output by a null-seeking feedback circuit within pulse width modulator 46. When the attenuated combined signal energy equals the unattenuated noise signal energy, zero-balance occurs. Preferably, when the noise source 77 is turned on for example for calibration, the signal passes through the attenuator 42.

The detector 43 is operable to receive the signal of the adjustment device and output an error signal input to the synchronous detector 44.

The synchronous detector 44 is operable to output signals to the feedback amplifier, which are later applied as input to the pulse-width modulator 46 to control the width of the pulses thereof.

The feedback amplifier 45 is operable to amplify the output signal of the synchronous detector 44 and output an amplified feedback signal.

The pulse-width modulator 46 is operable to receive and process the amplified feedback signal and output pulses as the result thereof to the logic circuit 75 and/or to the display 47. The duty cycle of the modulator 46 is proportional to the amount of noise signal energy needed to balance the circuit, thus the modulator derives an average DC voltage. The DC output can be used as a relative value in a temperature comparison mode of operation without calibration.

The display 47 is preferably a temperature display and operable to present the results of the pulse-width modulator 46 in a visual form.

The logic circuit 75 synchronously operates the switches of the adjustment device, the synchronous detector 44 and the noise source 77. Furthermore, the logic circuit receives the signals of the pulse-width modulator 46 and sends them to the noise source 77.

The noise source 77 is turned on or off by the logic device 75 depending on whether the received antenna signal should be combined with the noise signal for calibration reasons or not. The signal of the pulse-width modulator 46 is capable to set the temperature of the noise source 77 based on the average DC voltage.

The invention claimed is:

1. A radiometer for detecting electromagnetic signals in a microwave and millimeter wave range, the radiometer comprising:
    an antenna operable to receive the electromagnetic signals;
    an internal noise signal generator operable to receive a control signal and to generate and output a calibration noise signal depending on the control signal; and
    a coupler operable to couple the received electromagnetic signal with the calibration noise signal and to output a coupled electromagnetic signal,
    wherein the internal noise signal generator is activated based on the control signal.

2. The radiometer according to claim 1, further comprising:
    a detector operable to receive and process the coupled electromagnetic signal and to output a temperature value based on the coupled electromagnetic signal.

3. The radiometer according to claim 2, further comprising:
    a logic circuit operable to receive, process and send data from and to the detector and to send the control signal to the internal noise signal generator.

4. The radiometer according to claim 1, wherein the control signal is a square wave signal.

5. The radiometer according to claim 1, wherein the control signal is a pulse-width modulated signal.

6. The radiometer according to claim 1, further comprising:
    an antenna noise signal generator operable to generate and output an antenna noise signal which is coupled to the received electromagnetic signal before the calibration noise signal is coupled to the received electromagnetic signal.

7. The radiometer according to claim 1, wherein
    the control signal comprises a signal level for calibrating the radiometer and a signal level for measuring the received electromagnetic signals, and the time length of the signal level for measuring the received electromagnetic signals is longer than the time length of the signal level for calibrating the radiometer.

8. A method for detecting electromagnetic signals in a microwave and millimeter wave range, the method comprising the steps of:

receiving the electromagnetic signals via an antenna;

generating a calibration noise signal depending on a control signal; and coupling the electromagnetic signal with the calibration noise signal, wherein the generation of the calibration noise signal is activated based on the control signal.

9. The method according to claim 8, further comprising the step of:

outputting a coupled electromagnetic signal, after coupling the electromagnetic signal with the calibration noise signal.

10. The method according to claim 9, further comprising the step of:

receiving and processing the coupled electromagnetic signal by a detector; and outputting a temperature value based on the coupled electromagnetic signal.

11. The method according to claim 10, further comprising the step of:

receiving, processing and sending data from and to the detector and sending the control signal to a noise signal generator to control the generation of the calibration noise signal.

12. The method according to claim 8, wherein the control signal is a square wave signal.

13. The method according to claim 8, wherein the control signal is a pulse-width modulated signal.

14. The method according to claim 8, further comprising the step of:

generating and outputting an antenna noise signal by an antenna noise signal generator, wherein said antenna noise signal is coupled to the received electromagnetic signal before the calibration noise signal is coupled to the received electromagnetic signal.

15. The method according to claim 8, wherein the control signal comprises a signal level for calibrating the radiometer and a signal level for measuring the received electromagnetic signals, and the time length of the signal level for measuring the received electromagnetic signals is longer than the time length of the signal level for calibrating the radiometer.

* * * * *